UNITED STATES PATENT OFFICE.

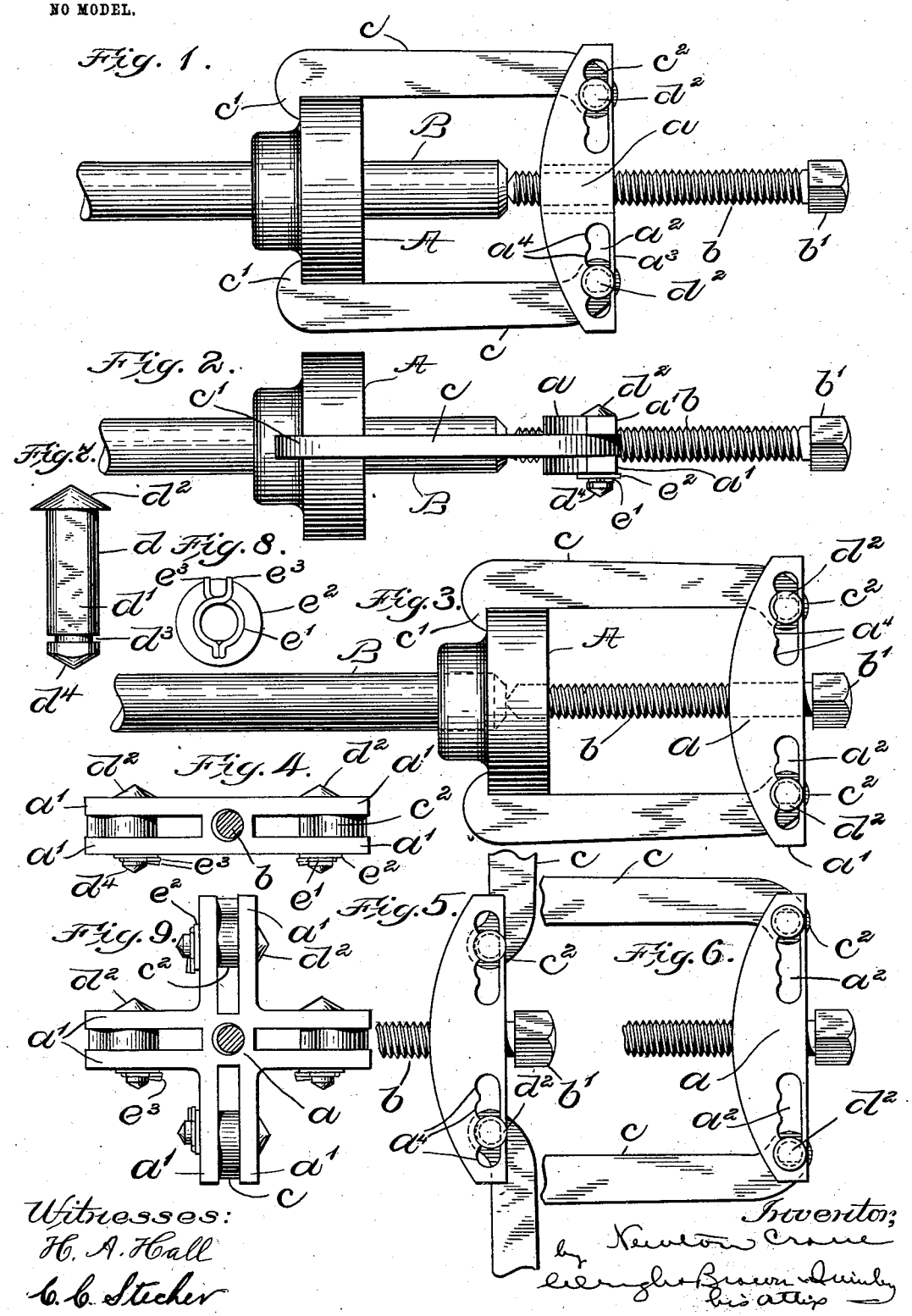

NEWTON CRANE, OF BOSTON, MASSACHUSETTS.

TOOL.

SPECIFICATION forming part of Letters Patent No. 724,818, dated April 7, 1903.

Application filed March 5, 1902. Serial No. 96,797. (No model.)

*To all whom it may concern:*

Be it known that I, NEWTON CRANE, of Boston, in the county of Suffolk and State of Massachusetts, have invented certain new and useful Improvements in Tools, of which the following is a specification.

This invention has for its object to provide a tool or contrivance for stripping wheels, cams, sleeves, and other parts from a shaft or bar.

In machine-shops, and particularly where experimental or repair work is done, it is necessary to frequently remove from a shaft or bar some part which is placed thereon and which ordinarily fits snugly or tightly. The removal of such part has heretofore been accomplished with considerable labor and the expenditure of unnecessary time, so that the tool or appliance which I have invented is designed to remove the parts referred to from a shaft with comparative ease and with the least possible expenditure of time and labor. The appliance is so constructed as to be capable of adjustment, whereby it can be employed for removing wheels, cams, or other parts of various diameters.

The invention consists of three essentials—to wit, means for engaging the part to be removed, a nut to which the means are attached, and a screw passing through said nut and adapted to engage the end of the shaft on which the said part is located.

According to the illustration of the invention the means for engaging the part to be removed comprise two hooked arms which are adapted to be swung about pivotal connections toward and from each other, the said connections being capable of adjustment upon the nut to accommodate the arms for the removal of parts of various sizes.

Referring to the accompanying drawings, which illustrate the invention, Figure 1 represents a shaft having a collar thereon and my appliance in position to effect the removal of said collar. Fig. 2 represents an edge view of the same. Fig. 3 illustrates the position of the parts when the collar is almost completely removed from the shaft. Fig. 4 represents an end view of the appliance with the screw in section. Fig. 5 represents the arms in position to be adjusted relatively to the nut. Fig. 6 illustrates the position of the arms after adjustment. Figs. 7 and 8 illustrate a pintle for pivotally connecting an arm with the nut and a device for detachably securing the pintle in place. Fig. 9 illustrates a form of the invention in which arms are attached.

As previously stated, the tool or appliance comprises the nut $a$, the screw $b$, and the swinging arms $c$ $c$. The screw $b$ is provided at its end with a head $b'$ of wrench-retaining formation by which it may be rotated and caused to move longitudinally through the nut $a$. The said nut is provided with two pairs of laterally-projecting lugs $a'$ $a'$, the lugs of each pair being arranged in parallelism to receive between them the ends of the arms $c$. These lugs are longitudinally slotted, as at $a^2$, one wall of each slot being straight, as at $a^3$, and the other wall being formed with a series of rounded notches $a^4$, as clearly shown in Figs. 1, 5, and 6, for a purpose to be described.

The arms $c$ $c$ are provided on their free ends with hooks or engaging portions $c'$, which project inwardly or toward each other, the opposite ends of said arms being likewise bent inwardly, as at $c^2$, and being apertured to receive pintles $d$ $d$, which are located substantially in alinement with the inner walls or edges of the said arms, so that the longitudinal pull upon the arms will not cause them to be separated.

The pintles $d$ $d$ may be formed in any desired way and are preferably removable. Each is flattened, as at $d'$, along one side to fit in the complementally-shaped aperture in the arms. The aperture is so formed in the arm that when the arms are in operative position, as in Figs. 1 and 3, the flattened portions $d'$ of the pintles will be at an angle to the flat or straight walls $a^3$ of the slots $a^2$. The pintle is formed at one end with a head $d^2$ and at the other end with a groove $d^3$ for the reception of a spring-catch $e'$ on a washer $e^2$. The spring-catch $e'$ may be formed of wire, as indicated, bent to provide the two ends $e^3$, which when pressed together will separate the two limbs of the wire and lift them out of the groove $d^3$. The spring-catch is secured upon the washer $e^2$ in any suitable way.

The head $d^2$ and the washer $e^2$ and spring-catch $e'$ hold each pintle against longitudinal movement or displacement. It will be observed that when the arms are in operative position the pintles lie in the curved notches $a^4$, formed in the side walls of the slots $a^2$, and are prevented from moving longitudinally of the slots. In order to adjust said arms toward and from the center of the nut, the arms may be swung outward or away from each other, as shown in Fig. 5, to bring the flat sides $d'$ of the pintles in parallelism with the walls of the slot $a^2$, at which time said arms may be moved in the slots to any desired position, after which the arms are again swung toward each other to partially rotate the pintles, and thus hold the arms in the adjusted position, as indicated in Fig. 6.

In Figs. 5 and 6 the arms are broken away; but it is to be understood that they are relatively longer in these figures than in Figs. 1 to 3, inclusive, for it is my purpose to provide each nut with a plurality of sets of arms of different lengths, so as to adapt the tool for use on different sizes or lengths of shafts or bars. Each set of arms is readily detachable by removing the pintles from the ends of the arm. Each nut may be formed with a different number of bars or lugs. It will be seen in Fig. 9 that instead of having two, as in Fig. 7, the nut is provided with four bars, so that there are four arms for engaging the parts to be removed from the shaft.

To assist in the securing of the spring-catch upon the end of the pintle, the latter is somewhat pointed, as at $d^4$. (See Fig. 7.)

The operation of the device will be readily understood. The arms are adjusted to proper position, their hooked ends are slipped over the periphery of the part A, and the nut $b$ is engaged with the end of the shaft B. By a suitable tool the screw is rotated and the shaft is forced from the part A as the screw is advanced through the nut.

By providing the device with the radial lugs and the pivoted connection of the arms therewith one set of arms may be employed for cams or parts of different sizes. The arms are free to swing independently of each other and may be widely separated at their free ends to embrace articles of uneven shape.

Having thus explained the nature of the invention and described a way of constructing and using the same, although without attempting to set forth all of the forms in which it may be made or all the modes of its use, I declare that what I claim is—

1. An appliance for separating two members, comprising a nut having radial lugs, arms in free pivotal relation to said lugs and having provisions on their free ends for engagement with one of said members, and a screw passed through said nut and adapted to be engaged with the other of said members.

2. An appliance for separating two members, comprising a nut having radial lugs, arms in pivotal relation to said lugs, and bodily adjustable at their pivoted portions toward and from the center of said nut, and a screw passed through said nut, said arms and nut being adapted for engagement with the said respective members.

3. An appliance for separating two members, comprising a screw, coacting arms, pintles on said arms, and a nut through which said screw is passed and having radial lugs with provisions for the reception of said pintles at any of a plurality of points at different radial distances from the said screw, said screw and arms having provisions for engagement with said respective members.

4. An appliance for separating two members, comprising a screw, coacting arms each having a hook at one end and a pintle at the other, the pintles having their sides flattened, and a nut having radial slots the walls of which are respectively flat and notched.

5. An appliance for separating two members, comprising a screw, a nut, and hooked arms in pivotal relation to said nut, said nut and arms having provisions whereby said arms are bodily adjustable at their pivoted portions toward or from each other when moved to inoperative or abnormal position, and are held against bodily adjustment when in operative position.

In testimony whereof I have affixed my signature in presence of two witnesses.

NEWTON CRANE.

Witnesses:
M. B. MAY,
GEORGE PEZZETTI.